United States Patent [19]
McDavid et al.

[11] Patent Number: 4,745,628
[45] Date of Patent: May 17, 1988

[54] SYMBOL GENERATOR FOR PHASE MODULATED SYSTEM

[75] Inventors: William T. McDavid, Allen; William W. Bryce, Dallas, both of Tex.

[73] Assignee: Terra Marine Engineering, Inc., Dallas, Tex.

[21] Appl. No.: 852,200

[22] Filed: Apr. 15, 1986

[51] Int. Cl.[4] .............................................. H04L 5/12
[52] U.S. Cl. ........................................ 375/39; 375/67; 332/16 R; 328/14; 364/721
[58] Field of Search ............... 375/39, 67, 38; 332/16, 332/9 R, 11 R; 328/14; 379/418; 364/721, 724

[56] References Cited

U.S. PATENT DOCUMENTS

| | | | |
|---|---|---|---|
| 3,773,975 | 11/1973 | Koziol | 332/9 R |
| 3,935,386 | 1/1976 | Glasson et al. | 375/67 |
| 4,339,724 | 7/1982 | Feher | 328/164 |
| 4,346,448 | 8/1982 | Insam et al. | 332/16 R |
| 4,511,862 | 4/1985 | Motiwala et al. | 375/67 |
| 4,567,602 | 1/1986 | Kato et al. | 375/67 |
| 4,617,535 | 10/1986 | Unerdem | 332/16 R |

OTHER PUBLICATIONS

"IEEE Transactions on Communications", vol. Com-31, No. 5, May 1983, pp. 702–707, by Kamilo Feher.

Primary Examiner—Benedict V. Safourek
Assistant Examiner—Andrew J. Telesz, Jr.
Attorney, Agent, or Firm—Gregory M. Howison

[57] ABSTRACT

A symbol generator is provided for generating a filtered analog waveform for use in phase modulating a carrier. A memory (30) is provided for storing predetermined waveform segments. The waveform segments are correlated with an input data stream. The data stream is converted to an address for the memory (30) to output a digital value to a D/A converter (122). The output of the D/A converter (122) is comprised of in-phase and quadrature-phase components which are input to a sample and hold circuit for generating the analog signals. The waveform segments are then sequentially assembled and input to a vector modulator (168).

21 Claims, 7 Drawing Sheets

SYMBOL GENERATOR FOR PHASE MODULATED SYSTEM

TECHNICAL FIELD OF THE INVENTION

The present invention pertains in general to phase modulation systems and, more particularly, to the filtering of the signal utilized to phase modulate a carrier.

BACKGROUND OF THE INVENTION

Communication systems have evolved over the years to utilize numerous modulation techniques for modulating a carrier. They usually range from amplitude modulation to frequency and phase modulation. For digital systems, some of the more widely used modulation techniques are phase-shift key (PSK) and frequency shift key (FSK) and variations thereof. The selection of the appropriate modulation scheme is a function of a number of factors such as bandwidth, signal to noise ratio and data rate.

In communication systems where a large number of channels are utilized, it is necessary that each channel have a defined bandwidth and that data in one channel does not interfere with data in an adjacent channel (i.e., adjacent channel interference). Therefore, the modulation scheme utilized in this type of system would be influenced by the bandwidth constraints and the required signal to noise ratio of the system in addition to other factors. However, it is imperative that the sidebands of the modulated carrier be confined within the bandwidth of the channel in order to reduce the adjacent channel interference. Such systems as quadrature phase shift key (QPSK) and offset quadrature phase key (XQPSK) have been devised to reduce intersymbol interference and jitter that results from the filtering required for multi-channel systems. In addition, constant envelope modulation schemes such as tamed frequency modulation (TFM) and correlative phase-shift key (CORPSK) have been proposed. These systems provide smooth phase transitions which consequently improve spectral efficiency.

Another method of improving spectral efficiency is cross-correlated phase-shift key (XPSK) which is described in Feher, "IEEE Transactions on Communications", Vol. Com-31, No. 5, May 1983, pp. 702-707. In this system, the two quadrature channels are cross-correlated to smooth the transition from one phase point to another. The XPSK system utilizes a number of predetermined waveform segments to synthesize the quadrature signals. By examining the data stream, a determination can be made as to the conditions necessary for cross-correlation and the appropriate waveform segment to output to a linear modulator. The linear modulator modulates a carrier with the snythesized cross-correlated quadrature waveforms and outputs the modulated carrier to the system. The waveform systhesis is described in U.S. Pat. No. 4,339,724, issued to Feher on July 13, 1982. This system utilizes a group of waveform generators which are multiplexed in time to take particular segments of those waveforms and combine them to output a filter function. However, this system is difficult to implement and the waveform segments are limited to the functions that can be generated.

SUMMARY OF THE INVENTION

The present invention disclosed and claimed herein comprises a filter for filtering digital data. The filter includes a memory for storing digital representations of analog waveform segments at predetermined addressable locations. Each of these segments corresponds to the cross-correlation of a predetermined filter function with a predetermined number of data bits in the data stream. Each combination of data bits correspond to a unique one of the waveform segments. An address generator is provided for receiving these data bits and examining each frame of data bits which correspond to one of the waveform segments. The information contained in the data bits is utilized to generate a unique address to select a corresponding one of the waveform segments from the memory for output therefrom. The waveform segment is converted to an analog format and then each of the wavefrom segments is assembled into an analog filtered waveform. Each of the segments has a duration equal to the duration in each of the data bits with each subsequent waveform segment being added onto the previous waveform segments as the digital data stream is sequenced at its bit rate.

In an alternate embodiment of the present invention, the filter is utilized in a phase modulation system wherein the analog waveform is utilized to phase modulate a carrier. The phase modulation system in the preferred embodiment is a quadrature phase shift key system wherein both an in-phase and quadrature phase component are generated. The waveform segments are stored with one portion representing the in-phase component and a second portion representing the quadrature phase component. For each clock cycle of the data stream, both an inphase and quadrature phase waveform segments are generated and output to form two filtered waveforms. These two filtered waveforms are then input to a vector modulator and the modulated carrier output.

The predetermined filter function cross-correlated with the data can either be applied in the amplitude domain or the phase domain. In the system applying the filter function to the phase domain, the data is first converted to the phase domain, then the filter function cross-correlated therewith and then the filtered waveform converted to either the amplitude domain or left in the phase domain. The waveform segments are then stored.

DETAILED DESCRIPTION OF THE DRAWINGS

For a more complete understanding of the present invention and the advantages thereof, reference is now made to the following description taking in conjunction with the accompanying Drawings in which.

DETAILED DESCRIPTION OF THE INVENTION

Figure 1:
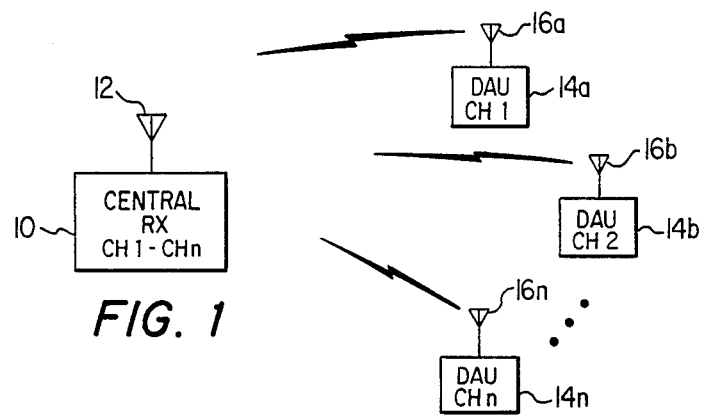
FIG. 1 illustrates a system diagram of the centralized receiver and remote acquisition units.

Referring now to FIG. 1, there is illustrated a block diagram of a system which utilizes the present invention. The system is comprised of a central command receiver 10 which operates on multiple channels CH1–CHn and receives modulated carrier signals through an antenna 12. A plurality of data acquisition units (DAU) 14a–14n are disposed at various remote locations with respect to the central command receiver 10. Each of the DAUs 14'–14n operate on a different channel CH1–CHn and transmits a carrier that is modulated with data to the central command receiver 10 through antennas 16a–16'n. This system is generally described in U.S. patent application Ser. No. 528,040, filed on Aug. 31, 1983 and assigned to the present assignee.

Each of the DAUs 14a–14n of FIG. 1 accumulates data for transmission to the central command receiver 10 such that data is being continually transmitted on each of the channels CH1-CHn in real time. The data is in the form of digital data which must be transmitted within a relatively narrow bandwidth, with the adjacent channel interference minimized.

Figure 2:
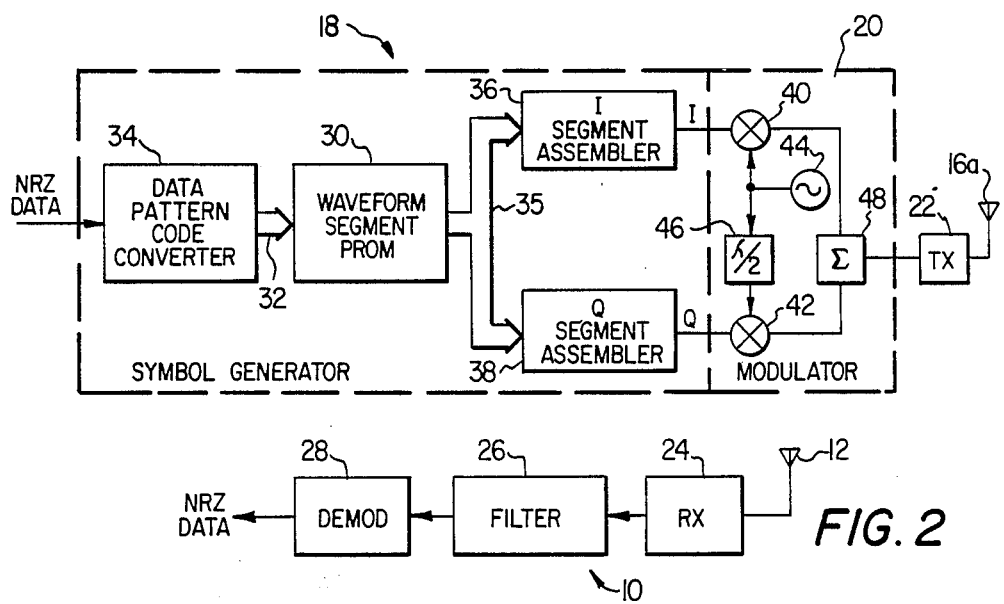
FIG. 2 illustrates a schematic block diagram of the transmitter and receive for the system.

Referring now to FIG. 2, there is illustrated a schematic block diagram of a system for modulating the carrier on the DAUs 14a–14n, of which only DAU 14a is illustrated. The DAU 14a is comprised of a symbol generator 18 which receives nonreturn to zero (NRZ) data and converts this data to two quadraphase components I and Q. The quadraphase components are input to a quadraphase modulator 20, the output of which is input to an antenna 16a through a transmitter 22. The NRZ data is generated by various data acquisition and conditioning circuits (not shown). Any conventional data acquisition and processing circuit can be utilized to acquire the data and convert it into an NRZ digital format. The symbol generator 18 is operable to condition the NRZ data for transmission in a quadrature phase shift key system, the details of which will be described hereinbelow.

The command receiver 10 is comprised of a receiver 24 which is connected to the antenna 12, the output of the receiver 24 being input to a filter 26. The filter 26 conditions a signal for output to a demodulator 28 for demodulating the received data for output as NRZ data. The symbol generator 18 of the DAU 14a is comprised of a Programmable Read Only Memory (PROM) 30 which is utilized to store waveform segments. These waveform segments are addressed on an address bus 32 to selectively output various waveform segments. The segments are selected by a code converter 34 in accordance with a predetermined algorithm which is a direct function of the NRZ data which is input thereto. Each of the waveform segments upon being addressed are output on a data bus 35 for input to both an I-segment assembler 36 and a Q-segment assembler 38. The outputs of the segment assemblers 36 and 38 are analog outputs and are comprised of the appropriate assembled segments which were addressed by the code converter 34. The I-output of the segment assembler 36 is input to an up-converter 40 and the Q-analog component is input to an up converter 42 which are driven by a local oscillator 44 which is phase shifted by 90 degrees with respect to the up-converter 42 through a phase shift circuit 46. The outputs of the up-converters 40 and 42 are summed in a summation circuit 48 for output to the transmitter 22. The waveform segments stored in the waveform segment PROM 30 are derived by cross-correlating the NRZ data with a predetermined filter function, as will be described hereinbelow.

In operation a predetermined number of sequential bits in the NRZ day are examined to determine the required phase shift for the I- and the Q-components. This operation is performed in the data/address translator 34 with an address generated as a function of the data at the examined bit positions in the NRZ data string. This address is input to the waveform segment PROM 30 to address a particular waveform segment for both the I- and the Q-segments 36 and 38 respectively. For each sample of the predetermined number of bits in the NRZ data stream, one segment for the I- and Q-channel is output from the assemblers 36 and 38. The NRZ data stream is then advanced by one bit to select another waveform segment from the PROM 30. For example, if n-bits of NRZ data are examined in one "frame", the next frame examined would be comprised of a new data bit and n-1 bits in the previous frame. The segment in the second frame is then attached to the "tail end" of the previous assembled segment on the I- and the Q-channels. For each frame of NRZ data input to the code converter 34, a new segment is attached to the analog stream at the outputs of the assemblers 36 and 38 to form the I- and Q-components.

The waveform segments stored in the PROM 30 are determined in accordance with a predetermined algorithm wherein a predetermined filter function is cross-correlated with the data and the resultant stored as waveform segments. Depending upon the desired filtering, different filter functions can be applied and the filter function varied. This will be described in more detail hereinbelow. In order to change the filter function, it is only necessary to insert another PROM. Although the present symbol generator is utilized with QPSK system, it should be understood that a number of different systems such as multi-phase systems or even bi-phase systems can be realized with the symbol generator 18 of the present invention.

Figure 3:
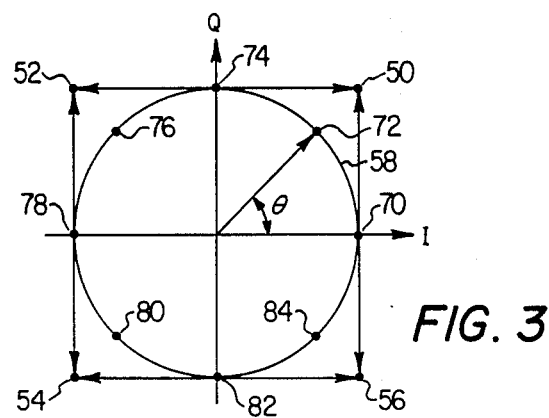
FIG. 3 illustrates a phase plot for a quadrature phase modulated system.

In order to better describe the generation of the waveform segments, a description of the general modulation will be necessary for one particular embodiment utilizing quadrature phase components. Referring to FIG. 3, there is illustrated a phase plot for the I- and the Q-components of a quadrature phase system which are 90% out of phase. In a standard QPSK system, the I- and the Q-waveforms are at either a positive one value or a negative one value. When both are at the positive one value, the phaser is at an angle of 45 degrees, represented by a point 50. When Q is positive and I is negative, the phaser is at 135 degrees and represented by a point 52. When both I and Q are negative, the phaser is at −135 degrees, represented by a point 54, and when I is positive and Q is negative, the phaser is at −45 degrees, represented by a point 56. When a change occurs, the phase changes from one of the points to an adjacent point on the box formed by the points 50–56; that is, the phase does not go diagonally across the phase diagram, for example, point 52 to point 54. This is to be distinguished from a biphase system wherein the phase shifts from +180° to −180°.

During transmission of these phase transitions, filtering is utilized to place the carrier within the bandwidth constraints of the channel. This results in some amplitude modulation which, upon amplification, results in unnecessary side bands. Therefore, the QPSK signal is degraded by AM to AM and AM to PM conversion after passing through a nonlinear device, for example, a high powered amplifier. This resulting spectral spreading introduces adjacent channel interference and degrades the bit error rate performance. It is normally difficult and/or not economical to design channel shaping bandpass filters which are located after nonlinear high power transmit amplifiers.

One method in the prior art which has been posed to alleviate this problem is a cross-correlated phase shift key (XPSK) system wherein cross-correction between the N-phase channel and the quadrature channel is introduced. This is described in Feher, IEEE Transactions On Communications", Vol. Com-31, No. 55, May 1983, pp. 701–707 and U.S. Pat. No. 4,339,724, issued July 13, 1982 to Feher.

In the Feher device, the response is smoothed to provide a more even transition of the phaser. This is represented by a response curve 58. The response curve 58 illustrates a smooth response wherein the phaser makes no sharp transitions from one point to the other, thus resulting in reduced sidebands. The Feher references disclose one method of realizing the response curve 58. Essentially, it is important to recognize the relationship of the in-phase and quadrature-phase channels and to adjust the amplitude thereof to maintain the magnitude of the phaser at a near-constant level. By maintaining the magnitude of the phaser vector quasi-constant, AM is minimized and side bands due to non-linear amplification are reduced.

The present invention utilizes two methods for developing the waveform segments stored in the PROM 30 in order to realize the curve 58. In the first method, the in-phase and quadrature-phase components are cross-correlated and predetermined waveform segments assembled in accordance with this cross-correlation. In the second method, a filter function is applied in the phase domain to define the actual desired phase response. This is then converted to the main and appropriate segments stored in the PROM 30.

Figure 4A:
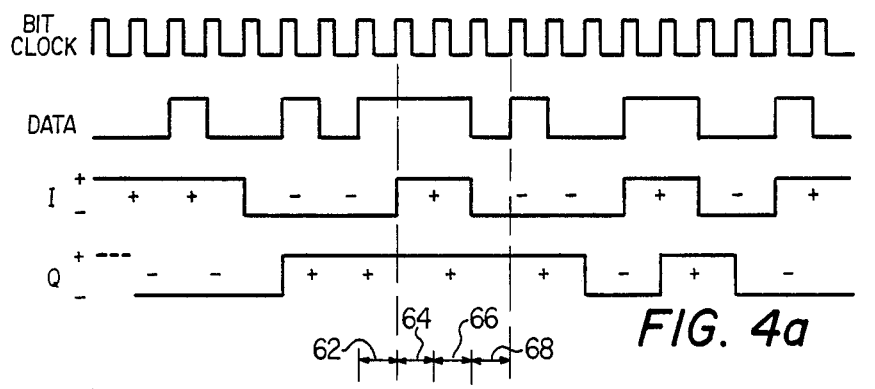
FIGS. 4a and 4a illustrate timing waveforms and filtered quadrature components for a QPSK system.

Referring now to FIG. 4a, there is illustrated a timing diagram for generating the in-phase (I) and quadrature-phase (Q) components of the NRZ data stream. Each bit of data corresponds to one period of the bit clock whereas each "symbol time" for each of the I- and Q-channels comprises two cycles of the bit clock with the Q-waveform offset by one period of the bit clock from the I-waveform. In a conventional QPSK system, the digital I- and Q-signals would be input to a linear modulator to provide the waveform of FIG. 3. For the reasons described above, this transmission method is not suited for closely spaced channels due to sideband interference between channels. This is especially aggravated because of non-uniform signal strength between channels at the receiver.

Figure 4B:
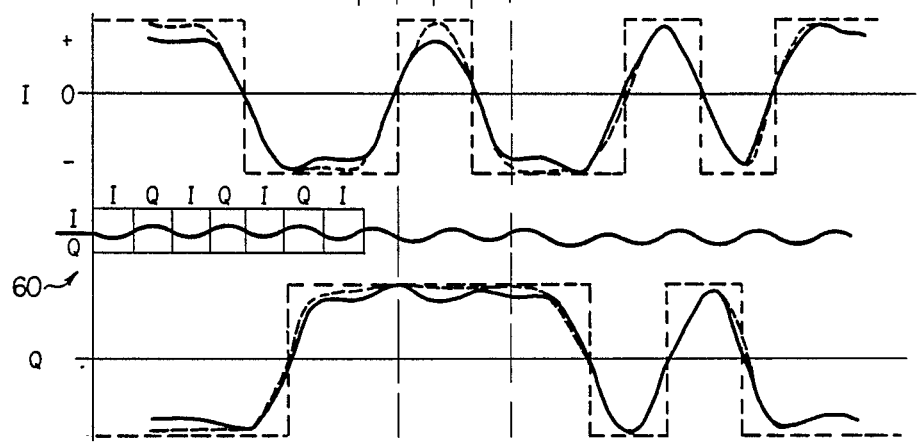

Referring particularly to FIG. 4b, there are illustrated waveforms for the filtered in-phase and quadrature-phase components. The dotted lines illustrate the unfiltered waveforms wherein the high frequency components are filtered to remove the sharp transitions. However, as described above, when the signal represented by the dotted lines is passed through a conventional system, amplitude modulation results, thus spreading the spectrum. The cross-correlated function utilized to realize the curve 58 of FIG. 3 is illustrated with a solid line. The logic state of the in-phase and quadrature-phase components are illustrated by blocks 60 having a width of one cycle of a bit clock wherein a "+" represents a high logic state and a "−" represents a low logic state. In order to provide the cross-correlation function for one embodiment of the present invention, it is necessary to know at least the previous state of the phaser and what the next state of the phaser will be in addition to what the present state of the phaser is. This information is then utilized to generate a waveform segment for each half symbol time, a half symbol time being equal to one cycle of the bit clock.

For example, four half symbol times 62, 64, 66 and 68 are represented. For purposes of explanation, eight points are defined on the curve 58 of FIG. 3. A point 70 represents zero degrees, a point 72 represents 45 degrees, a point 74 represents 90 degrees, a point 76 represents 135 degrees, a point 78 represents 180 degrees, a point 80 represents −135 degrees, a point 82 represents −90 degrees and a point 84 represents −45 degrees. At the beginning of half symbol time 62, the phaser is at a point 76. It should be noted that both the amplitude of the I-channel and the amplitude of the Q channel are reduced to approximately 0.707 of the maximum amplitude. Otherwise, the phaser would lie on the point 52, thus requiring the amplitude to be reduced when traversing the curve 58 between the points 78 and 74.

At the beginning of the half symbol time 64, the phaser is at a point 74, thus requiring the amplitude of the Q-channel to increase since the amplitude of the I channel is at a zero level. At the end of the half symbol time 64, the phaser traverses the curve 58 to the point 72, thus requiring both the amplitude of the I-channel and the amplitude of the Q channel to be reduced. For the half symbol time 66, the phaser traverses from the point 72 back to the point 74 since the Q-waveform remains positive.

In order to realize the waveform during the half symbol time 66, it is necessary to know what the waveform was during the half symbol time 64 in order to know where the starting point is; that is, it is necessary to know that the phaser traversed the curve 58 from the point 74 at the beginning of half symbol time 64 to the point 72 at the end of the sample period. It is therefore necessary to know that both the Q- and I-channel were positive during sample time 64 and that the Q channel remains positive during half symbol time 66 while the I-signal was going negative. This therefore requires four bits of data to provide a correlation function. The waveform thus requires a cosine-like function initiated at an amplitude less than maximum amplitude and decreasing to zero. Simultaneously, the Q-channel requires a waveform that is initiated at an amplitude less than the maximum amplitude and increasing to maximum amplitude during the half symbol time 66. This concept is fully described in the Feher paper.

To generate the waveform necessary to realize the waveforms of FIG. 4b, sixteen different cross-correlated signal combinations are generated and are listed in Table 1.

TABLE 1

| I(Q) | Q(I) | Number of Combinations |
|---|---|---|
| $+/- \cos(\pi t/Ts)$ | $+/- \sin(\pi t/Ts)$ | 4 |
| $+/- A \cos(\pi t/Ts)$ | $+/- \sqrt{1 - A^2 \cos^2(\pi t/Ts)}$ | 4 |
| $+/- A \sin(\pi t/Ts)$ | $1 - k \sin^2(\pi t/Ts)$ | 4 |
| $+/- A$ | $+/- A$ | 4 | where
T = symbol period
$A = 1/\sqrt{2}$
$k = 1 - A$

Figure 5:
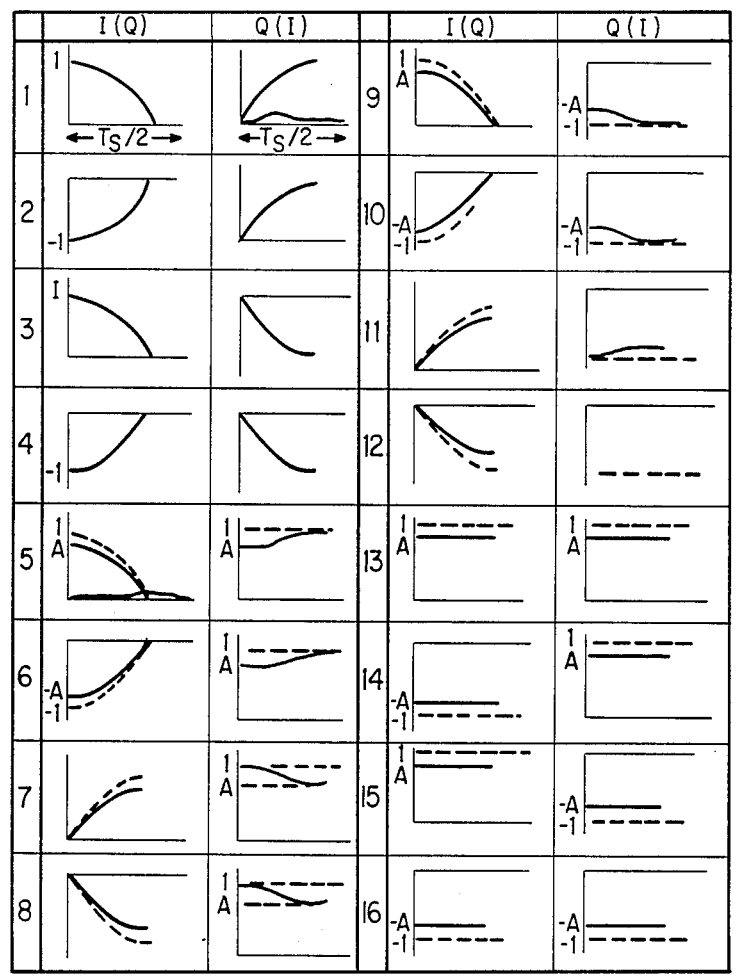
FIG. 5 illustrates waveform segments for one embodiment of the present invention.

The waveforms corresponding to the sixteen various combinations are illustrated in FIG. 5.

Each of the waveforms for each half symbol period are digitized and stored in the PROM 30. It is then only necessary to determine which waveform segment is necessary, output the waveform and then convert the digital data to analog data and assemble the segment into the respective I- and Q-waveforms. For each corresponding step of the I- and Q-waveforms, the sum of the squares of the waveforms with respect to I- and Q-channels will result in a carrier magnitude of unity. This results in minimum amplitude modulation.

Figure 6:
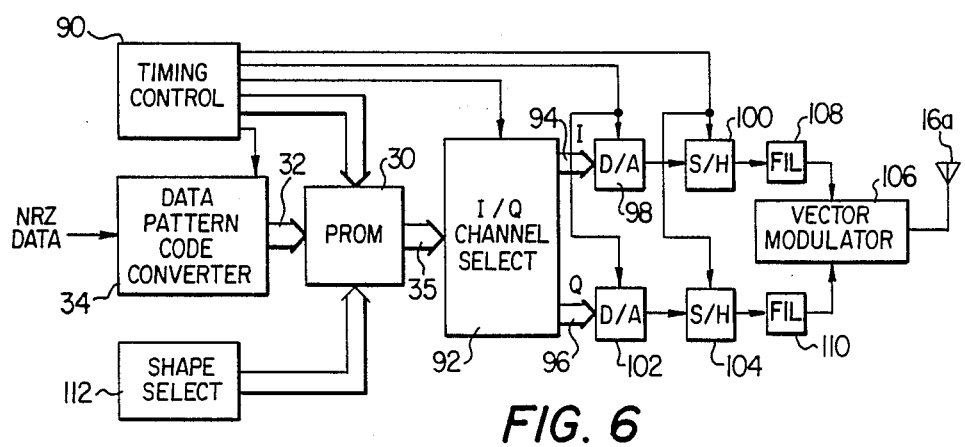
FIG. 6 illustrates a detailed schematic block diagram of the symbol generator.

Referring now to FIG. 6, there is illustrated a detailed schematic block diagram of the symbol generator 18 of FIG. 2, wherein like numerals refer to like parts in the various Figures. The NRZ data is processed through the data pattern code converter 34 as described above with reference to FIG. 3 and an address generated for input to the PROM 30 for addressing one of the waveform segments. The code converter 34 is controlled by a timing control 90 such that for each cycle of the bit clock, the data corresponding to the I- and the Q-waveforms for one half symbol time are output on the data bus 35.

An I/Q channel select circuit 92 is connected to the data bus 35 and is operable to separate the digital data and output the data corresponding to the I-channel on a bus 94 and the data corresponding to the Q-channel on a bus 96. The I-channel data is then passed through a digital to analog (D/A) converter 98 to a sample and hold circuit 100. In a similar manner, Q-channel data is input to a D/A converter 102 and then to a sample and hold circuit 104. Both D/A converters 98 and 102 and sample and hold circuits 100 and 104 are controlled by the timeing control circuit 90 to assemble the waveform. The I/Q channel select circuit 92, D/A circuits 98 and 102 and sample and hold circuits 100 and 104 comprise the I and Q segment assemblers 36 and 38 of FIG. 2.

After the I- and Q-waveforms have been assembled, the I-waveform is input to a vector modulator 106 through a filter 108 and the Q-waveform is input to the vector modulator 106 through a filter 110. The vector modulator 106 is identical to the modulator 20 of FIG. 2. The output of vector modulator 106 is connected to the antenna 16a.

As will be described hereinbelow, PROM 30 is memory mapped such that some prefiltering can be provided for the waveform segments prior to transmission. The analog value for the waveform segments stored in PROM 30 are generated on a computer such that the filtering can be altered prior to insertion of the PROM 30 into the circuit. In some applications, it is necessary to add such things as pre-emphasis to account for transmission path loss, delay, etc. Rather than insert a PROM for each application, each PROM can be pre-programmed with various filter functions. A shape select circuit 112 is provided which can select one of numerous sets of waveform segments. This is essentially an additional bit in the address with conventional memory mapping techniques being utilized.

Figure 7:
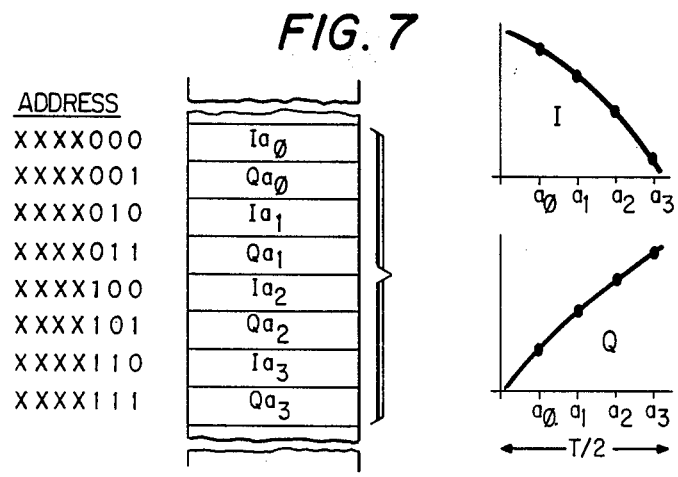
FIG. 7 illustrates a portion of the memory and the location of the waveform segments therein.

Referring now to FIG. 7, there is illustrated a portion of the memory containing waveform segments corresponding to one-half symbol time T/2. In order to have sixteen sets of symbols for this particular embodiment, a four bit address will be required to select one of the sixteen waveform segments set that are illustrated in FIG. 5. These are illustrated by the address of "XXXX". Each waveform segment is comprised of four digital values $a_0-a_3$. The digital data corresponding to the I-channel is labeled $Ia_0-Ia_3$ and the Q-digital data is labeled $Qa_0-Qa_3$. Once the waveform segments have been selected, the particular data corresponding to the value $a_0-a_3$ is selected with a two bit address. An additional bit is provided to select between the I- and the Q-channel and is operable to control the I/Q channel select circuit 92 of FIG. 6. This results in a seven bit address with the least significant bit being clocked at a rate twice the bit clock. The waveforms illustrated adjacent the memory segment of FIG. 7 correspond to the first set of I and Q waveforms of FIG. 5.

Figure 8:
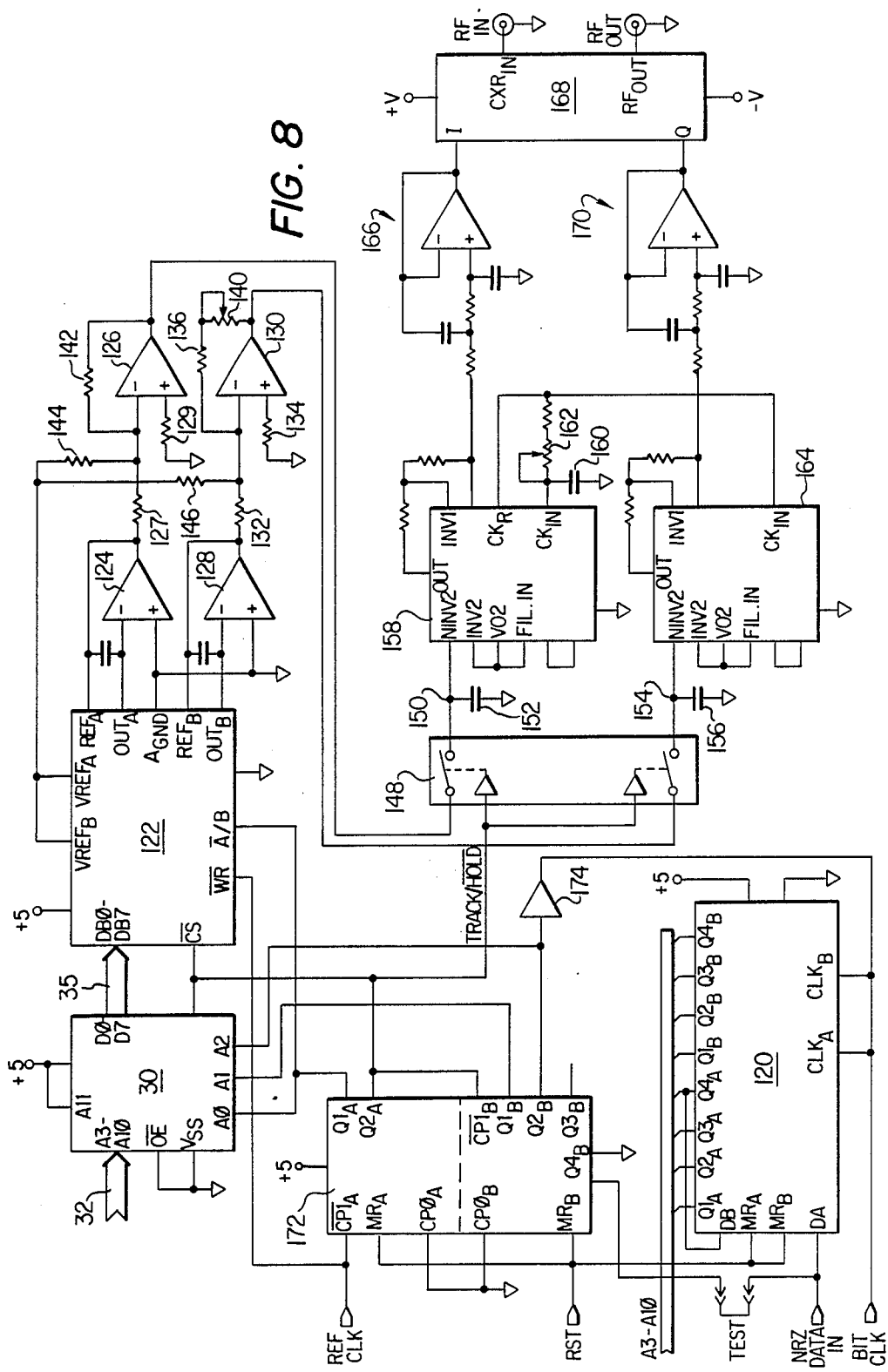
FIG. 8 illustrates a schematic diagram of the symbol generator.

Referring now to FIG. 8, there is illustrated a schematic diagram of the symbol generator and modulation portions of the DAU 14, wherein like numerals refer to like parts in the various Figures. The PROM 30 is comprised of an Erasable PROM (EPROM) of the type 27C16 manufactured by National Semiconductor. The address inputs A3-A10 of the EPROM 30 are connected to the outputs of a dual serial shift register 120 of the type 4015 manufactured by RCA. The first half of the shift register 120 has outputs $Q1_a-Q4_a$ and the second half has outputs $Q1_b-Q4_b$, with the $Q4_a$ output of the first half being input to the data input $D_b$ of the second half. The data input of the first half $D_a$ is connected to the NRZ data input. Both of the clock inputs of the shift register 120 are connected to the bit clock (BIT CLK).

The outputs $Q1_a-Q4_a$ correspond to the address inputs A3-A6 of the PROM 30 and the outputs $Q1_b-Q4_b$ correspond to the address inputs A7-A10 of the EPROM 30. The shift register 120 allows the system to examine eight data bits in the NRZ data stream to provide an eight bit window or frame. However, for the above embodiment utilizing the waveform segments of Table 1, only four bits are necessary and, therefore, only the address bits $A_3-A_6$ are utilized. As will be described hereinbelow, all eight address inputs $A_3-A_{10}$ are utilized for another embodiment.

The data output of the EPROM 30 on the data bus 35 is input to a dual D/A converter 122 of the type AD7528 manufactured by Analog Devices. The A-output of the D/A converter 122 is connected to the negative input of an op amp 124 with a positive input thereof connected to ground. The output thereof is connected to the negative input of an op amp 126 through a resistor 127. The positive input of the op amp 126 is a connected to ground through a resistor 129. The output of the op amp 124 is connected to the A reference of the D/A converter 122.

The output of the D/A converter 122 is connected to the negative input of an op amp 128, the positive input thereof connected to ground and the output thereof connected to the B reference output of the D/A converter 122. The output of the op amp 128 is connected to the negative input of an op amp 130 through a resistor 132, the positive input of the op amp 130 being connected to ground through a resistor 134. The op amp 130 is connected to the negative input thereof through a series resistor 136 and potentiometer 140 and the output of the op amp 126 is also connected to the negative input thereof through a feedback resistor 142. The negative inputs of op amps 126 and 130 are connected to a reference voltage VREF through resistors 144 and 146, respectively, VREF connected to the A- and B-reference inputs of the D/A converter 122. The op amps 124–130 are of the type HA4600-5 manufactured by Harris Semiconductors.

The output of op amp 126 is connected to one input of a dual FET switch 148 with the output of op amp 130 being input to the other input of the switch 148. The output of the switch 148 connected to op amp 126 is connected to a hold node 150, with a capacitor 152 being connected to ground from the node 150, capacitor 152 being a hold capacitor. In a similar manner, the output of the switch 148 associated with op amp 130 is connected to a hold node 154 with a capacitor 156 connected between the node 154 and ground.

The hold node 150 is input to a switched capacitor filter 158 of the type MF6-50 manufactured by National Semiconductors. The switched capacitor filter 158 has an internal clock which frequency is set by a capacitor 160 connected to ground and a series resistor 162 connected between the clock input and the clock reference. In a similar manner, a switched capacitor filter 164 has the input thereof connected to the hold node 154 with the clock reference connected to the clock reference of the switched capacitor filter 158. The output of the switched capacitor filter 158 is input through an active filter 166 to the I-input of a vector modulator 168. In a similar manner, the output of the switched capacitor filter 164 is input through an active filter 170 to the Q input of the vector modulator 168. The active filters 166 and 170 are of the low pass Butterworth type. The vector modulator 168 is of the type CPM-70 manufactured by Olektron. The output of the vector modulator 168 has an output set for frequencies between 72 to 76 MHz, the frequency depending upon the particular channel of operation.

A dual counter 172 is provided for generating timing signals. The input of the first half of the counter is connected to a reference clock which is set at a frequency of approximately 144 kHz. This clock is divided by two to output the AO address signal and the output $Q1_a$. This output is also connected to the A/B input of the D/A converter 122 to select between the two outputs. These two outputs, as described above, are the I- and Q-channels, respectively, for a given half symbol time. The $Q2_a$ output comprises the track and hold control signals and is connected to the controlled inputs of the FET switch 148. In addition, it provides the chip enable and chip select signals for both the EPROM 30 and the D/A converter 122. The $Q2_a$ output is connected to the clock input of the second half of the counter 172. The $Q1_b$ output of the second half of the counter 172 comprises the A1 address signal with the $Q2_b$ output comprising the A2 address signal. In addition, the $Q2_b$ signal is connected to clock inputs of the shift register 120 through a buffer 174 and comprises the bit clock signal. For test purposes, the $Q4_b$ signal can be connected through a jumper 176 to the NRZ data input of the shift register 120.

Figure 9:
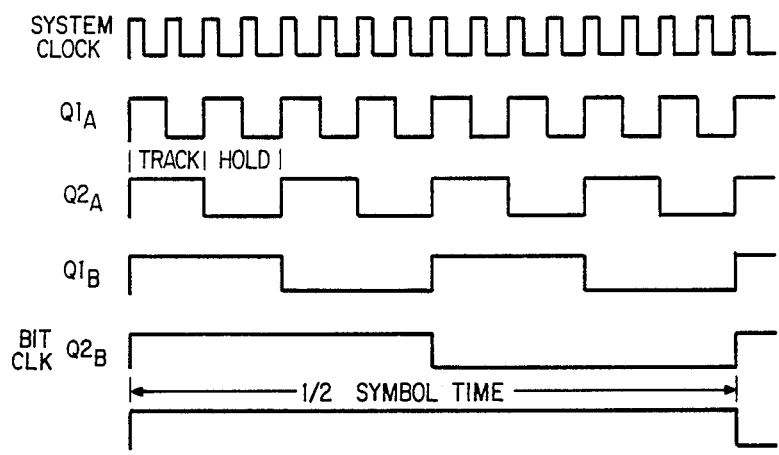
FIG. 9 illustrates timing diagram for the circuit of FIG. 8.

In order to describe the operation of the system, reference is now made to FIG. 9 which illustrates timing diagrams for operation of the system. Initially, the bit clock corresponding to the $Q2_b$ output of the counter 172 goes high, clocking in a new bit of data to the shift register 120. This changes the address on the address bus 32 and outputs a new field or address, as illustrated in FIG. 7 above. Initially, the address selects the first byte of data $a_O$ for the I channel during the time that $Q1_a$ is high with the switches of the FET switch 148 closed to allow the hold node 150 to track the voltage output from the D/A converter 122. During the second half of the cycle of $Q1_a$ when $Q1_a$ is low, the byte of data corresponding to the $A_0$ data for the Q channel is also output and stored in the capacitor 156. After both capacitors 152 and 156 track the voltage output from the D/A converter 122 of the I- and Q-channels, respectively, $Q2_a$ goes low to hold or store the voltages on the hold nodes 150 and 154. These voltages are filtered and input to the vector modulator 168. When $Q1_b$ corresponding to the A1 address goes low, this selects the $a_1$ data from the EPROM 30 for the I- and Q-channels. The $Q2_b$ output corresponding to the A2 address bit then goes low, to allow selection of the $a_2$ and $a_3$ data byte. One cycle of the bit clock corresponds to one half of a symbol time or one waveform segment stored in the EPROM 30 for both the I- and Q-channels.

The filter functions stored in EPROM 30 for the above described embodiment comprises cross-correlated functions for both the I and Q channel which utilize predetermined waveforms to allow the phaser in FIG. 3 to traverse the curve 58. However, this method requires that the waveform segments be realizable. With the use of stored waveform segments, however, this is a relatively easy matter since the waveforms can be simulated on a computer and generated for storage in the EPROM 30. However, the cross-correlation method utilized in the above embodiment required definition of the phaser operation and resulting curve and then adjusting the amplitude of the I- and Q-channels to "fit" this curve. This requires each segment stored in the EPROM 30 to have a different function.

Figure 10:
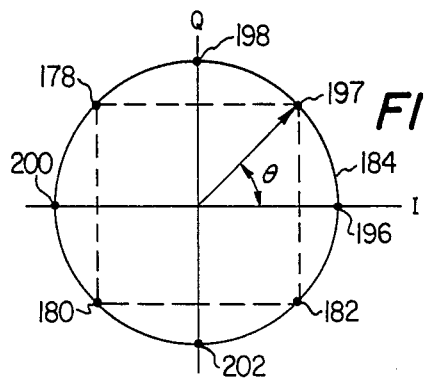
FIG. 10 illustrates a phase plot for an alternate embodiment of the present invention.
Figure 11:
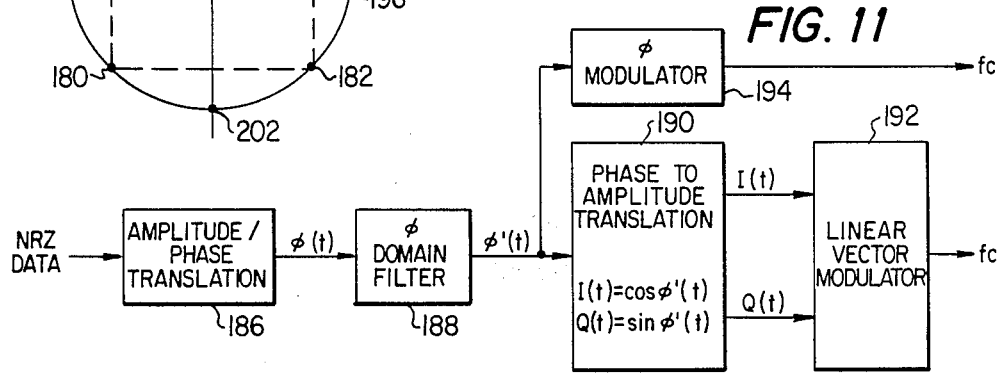
FIG. 11 illustrates a block diagram for the alternate embodiment of the present invention.

An alternative method for generating the waveform segments is to filter in the phase domain. With reference to FIG. 10, a phase plot for the quadraphase system is illustrated. The point representing 45° is indicated by the reference numeral 197, 135° represented by reference numeral 178, −135° represented by reference numeral 180 and −45° represented by reference numeral 182. These four points 177–182 are connected together with a dotted line to represent a box. This is the typical path for a transition between phases. In order to minimize spectrum spreading, it is necessary to smooth the path by causing the phaser to traverse a circle 184, as was the case in FIG. 3. However, with the above embodiment referred to in FIG. 3, the amplitude of the in-phase and quadrature-phase components was varied to obtain this relationship. In the second embodiment, the phase is filtered by first converting the data to the phase domain, and then filtering in the phase domain. For a phase modulation system, the phase can either by converted back to amplitude and conventional modulation devices utilized, since conventional devices typically operate in the amplitude domain to modulate the carrier. This system is illustrated in FIG. 11 where the first phase transition is referred to by a box 186 to provide a signal $\phi(t)$. $\phi(t)$ is then filtered by a filter 188 to provide a $\phi'(t)$ signal. This is translated to the quadrature-phase components I(t) and Q(t) in a box 190. This requires only taking the cosine and the sine of the filtered phase information to provide the Q- and I-waveforms, respectively. This is then input to a linear vector modulator 192. Alternatively the filtered phase $\phi'(t)$ can be input to a phase modulator 194 which can directly modulate the carrier $f_c$.

With the system of FIG. 8, the amplitude to phase translation, filtering in the phase domain and the translation back to amplitude are done on a computer and the results of the computer stored in EPROM 30. The data is then input to the shift register 120 and an appropriate waveform segment is addressed and then assembled at the output of the sample hold circuit. The sample and hold circuit is comprised of the filters 158 and 164 and the switch 148. In this manner, any filter function can be cross correlated with data to smooth the particular phase plot. This could be utilized with a quadrature phase system as illustrated in FIG. 10, a biphase system or even a multi-phase system. In the present embodiment of filtering in the phase domain, two techniques are utilized. First the number of points to filter on the curve 184 is increased by utilizing a technique known as Duo-Binary filtering. This is described in Desmond Taylor and David Cheung, "A Decision-Directed Carrier Recovery Loop For Duo-Binary Encoded Offset QPSK Signals", IEEE Transactions On Communications, Vol. Com. 27 No. 2, (Feb. 1979). The Duo-Binary technique increases the number of points by a point 196 at zero degrees, a point 198 at 90°, a point 200 at 180° and a point 202 at −90°. With this increased number of points, an impulse filter function can be applied to these points. Any conventional impulse filter function can be utilized for this smoothing process. Depending upon the filter function, a larger number-of-bits of the data before and after the point of interest must be examined in order to form the filtering. In the present embodiment, eight bits of data in the data stream are examined, thus requiring all eight output bits from the shift register 120 of FIG. 8.

An alternative embodiment of the present invention with the system of FIG. 11 would be to directly store the phase information which is represented by the phase domain filter 188. This phase information is stored as digital words in a PROM similar to the PROM 30 of FIG. 2. Once the phase relationship for the carrier is determined, this can be stored in "time" segments. Each of these segments would comprise four samples, each sample representing a digital word. Each line segment would have a beginning phase, an ending phase and a predetermined phase relationship in between the beginning and ending phase. These time segments would therefor be "phase segments." Each of these phase segments is selectable in accordance with the state of the NRZ data stream. At the given time in a particular time segment, the digital data corresponding to that phase segment would be sequentially output to the phase modulator 194 for direct phase modulation of the carrier. Therefor, the entire system would be in the phase domain without having to convert back to the amplitude domain to modulate a linear vector modulator. The other difference is that the phase information is directly stored as phase segments rather than converting this phase information amplitude information and storing waveform segments in the amplitude domain.

Figure 12:
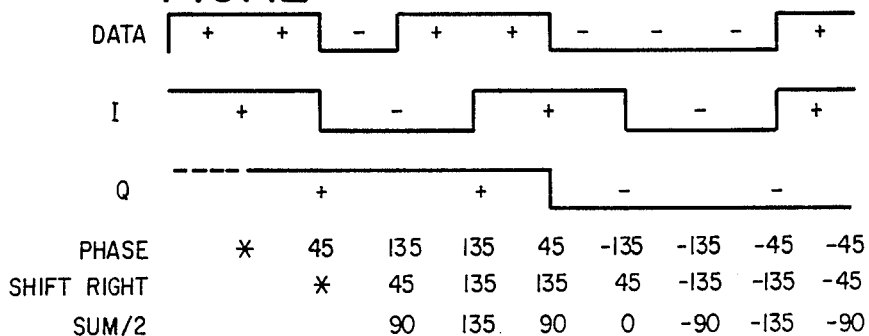
FIG. 12 illustrates timing diagrams for the duo binary filtering technique.

Referring now to FIG. 12, there is illustrated one example of the Duo-Binary filtering technique. Basically, the phase relationship is derived from the I- and the Q-channel which comprises the phase information that is modulated onto the carrier. This phase is shifted one half symbol to the right and then summed and divided by two. This is the result which is then plotted for each half symbol.

Figure 13:
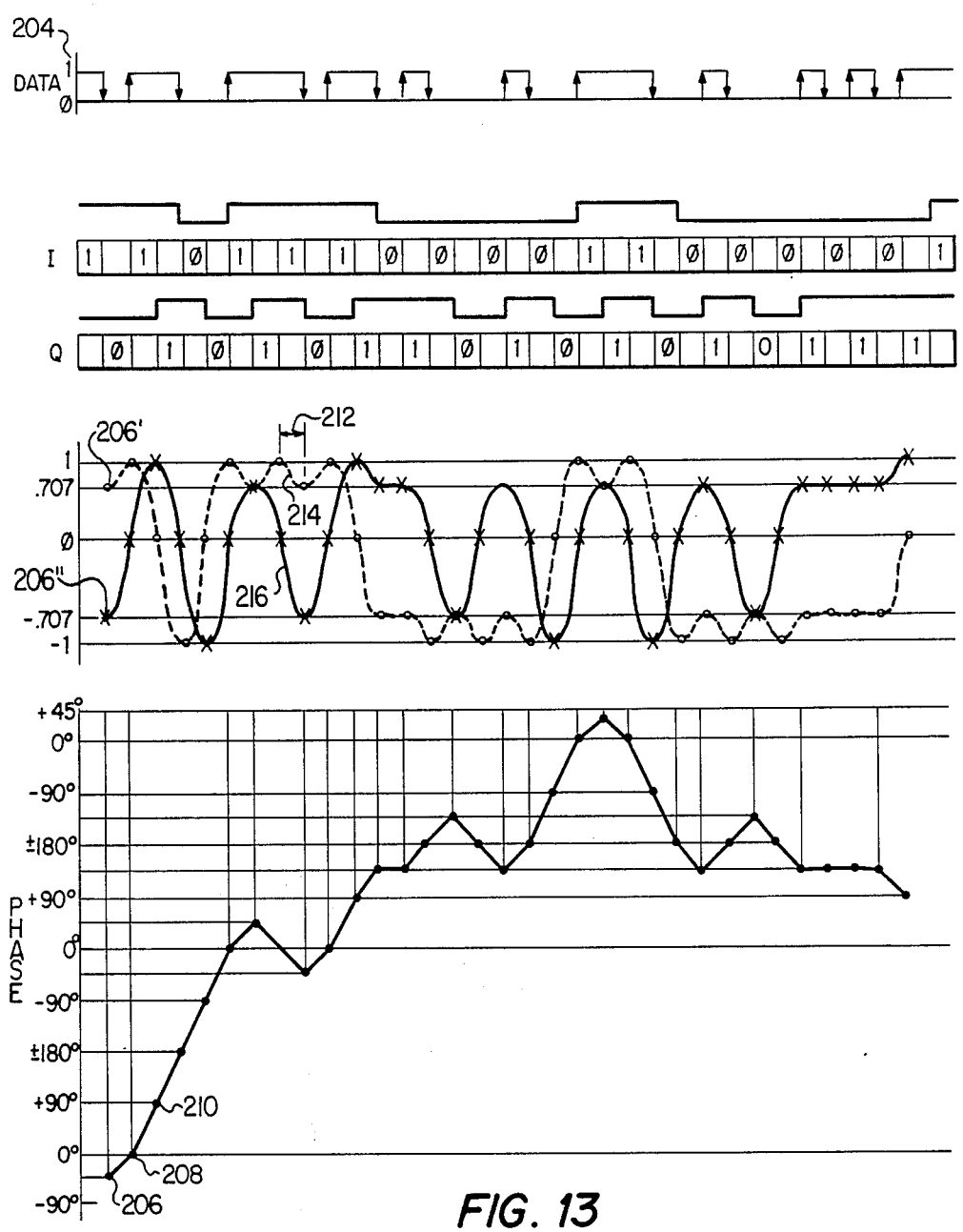
FIG. 13 illustrates amplitude and phase plots for the alternate embodiment.

Referring now to FIG. 13, there is illustrated a data stream 204 and subsequent I- and Q-plots prior to filtering and a phase plot after filtering the I and Q channels with a duo-binary filtering algorithm. In addition, the filter I- and Q-channels are illustrated with the I-channel illustrated in dotted lines and the Q-channel illustrated with a solid line. The initial portion of the waveform, as represented by a point 206, the waveform resides at a −45° phase, corresponding to point 182 on the circle 184 of FIG. 10. The next sequential point 208 is at 0°, corresponding to the point 196. The next sequential point 210 is at +90°, corresponding to the point 198. Without Duo-Binary filtering, the initial point would have resided at −45° and would have been centered in the half symbol time. The phaser would not change states until some time between the points 298 and 210, at which time it would move to the +45° state. The next state would change in the next half symbol time to −135°, just after the point 210. The Duo-Binary technique provides more transition points at which the phase plot can reside for a given sample. Once the phase plot has been generated, it is then necessary to smooth the curve between points. In order to do this, the curve is then passed through a finite impulse response filter with the filter examining approximately eight points from the graph. If a higher degree of filtering is desired, more points can be examined in time.

When the filter goes from −45° to 0°, it is not returned to the initial zero degrees but goes to 360°, i.e., it wraps around. Therefore, the phase continually increases in one direction with no large transition (270°) from −45° to zero degrees.

To generate the filter waveform for the I- and the Q-channels, the value for the I-channel is derived by taking the sine of the phase angle and the Q-channel is derived by taking the cosine of the angle. By definition, the amplitude will always be equal to unity since the amplitude is equal to the sum of the squares through the I- and Q-channel values. For example, a point 206′ corresponds to the amplitude value of the I-channel at the point 206 and in a similar manner, a point 206″ corresponds to the Q-channel value thereof. The finite impulse response has been applied to the phase plot such that the transition is smoothed between the various points plotted.

In order to synthesize the filtered I- and Q-waveforms illustrated in FIG. 13, it is only necessary to store the waveform segments for any given half symbol time. Since there are eight bits utilized in generating the finite impulse response filter function, there will be $2^8$ waveform segments or 256 waveform segments. For example, waveform segments corresponding to a half symbol time 212 would be a waveform segment 214 for the I-channel and waveform segment 216 for the Q-channel. These waveform segments would be addressed and output in accordance with the above described operation of the system of FIG. 8.

Figure 14:
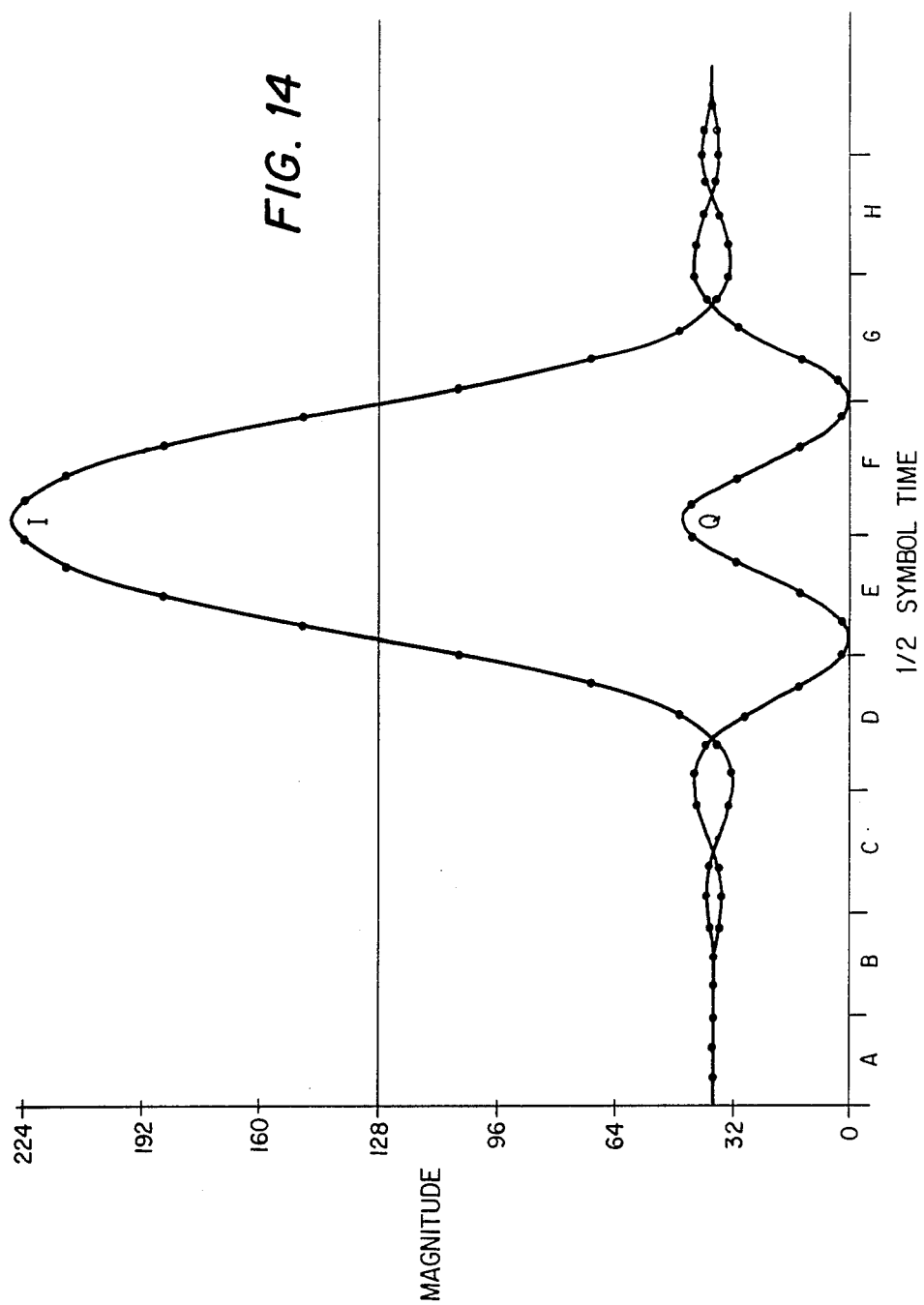
FIG. 14 illustrates an impulse function for the alternate embodiment of the present invention.

Referring now to FIG. 14, there is illustrated the filtered waveform for the I- and Q-channels corresponding to a data stream which is made up of a string of zero data bits, a logic one bit and followed by a stream of logic zero data bits. Each waveform segment is comprised of four data points $a_0$–$a_3$. The values for the I- and the Q-channels as a function of relative symbol time are illustrated in Table 2 wherein the half symbol times are represented by A through J.

TABLE 2

|   | I CHANNEL | | | | Q CHANNEL | | | |
|---|---|---|---|---|---|---|---|---|
|   | $a_0$ | $a_1$ | $a_2$ | $a_3$ | $a_0$ | $a_1$ | $a_2$ | $a_3$ |
| A | 37 | 37 | 37 | 37 | 37 | 37 | 37 | 37 |
| B | 37 | 37 | 38 | 38 | 37 | 37 | 36 | 36 |
| C | 38 | 35 | 33 | 32 | 36 | 39 | 41 | 42 |
| D | 36 | 47 | 70 | 106 | 38 | 28 | 13 | 1 |
| E | 148 | 186 | 213 | 225 | 1 | 13 | 31 | 43 |
| F | 225 | 213 | 186 | 148 | 43 | 31 | 13 | 1 |
| G | 106 | 70 | 47 | 36 | 1 | 13 | 28 | 38 |
| H | 32 | 33 | 35 | 38 | 42 | 41 | 39 | 36 |
| I | 38 | 38 | 37 | 37 | 36 | 36 | 37 | 37 |
| J | 37 | 37 | 37 | 37 | 37 | 37 | 37 | 37 |

In order to generate the waveform segments corresponding to a particular sequence of data in the NRZ data stream, the following computer program was generated.

```
0   '    Filename SYMB6.A
20  '    Started  02 Nov. 1984
30  '    Revised  25 July 1984
40  '    Symbol Generator ROM Codes:
50  '
136 DIM TA(255),PHASE(255,20),FLT(40),TC(20)
137 '
141 ' Read in filter data generated by DFIL03.A
142 '
143 OPEN "I",#5,"FILTR.DAT":K%=1
144 FOR I%=1 TO 50
145 IF EOF(5) GOTO 150 'READ IN FILTER
146 INPUT #5,TA(I%):NEXT I%
147 NEXT I%
150 MDP=(I%-1):NFP=MDP*2-1:FOR F%=MDP TO NFP:FLT(F%)=TA(K%):K%=K%+1:NEXT F%
151 I%=2
152 FOR K%=MDP-1 TO 1 STEP -1'MIRROR IMAGE OF FILTER
153 FLT(K%)=TA(I%):I%=I%+1:NEXT K%
154 FOR I%=1 TO NFP:PRINT I%,FLT(I%):NEXT I%
157 DMA=0
158 CLOSE #5
160 INPUT "assign output to console or printer ";VT$
165 IF VT$="P" OR VT$="p" THEN VT$=":TO:" ELSE VT$=":CO:"
170 SF = 91 * SQR(2) 'scale factor
210 PI = 3.14159
220 OFS%=128:PF=.5
1000 OPEN "I",5,"AMPLT.DAT"
1020 FOR I=0 TO 255
1030 INPUT #5,TA(I)
1040 NEXT I
1050 CLOSE #5
3000 '
3010 ' Build Phase combinational table
3020 '
3030 OPEN "O",1,VT$
3035 OPEN "O",4,"SYMB6.HEX"
3040 I=0
3050 FOR X7=0 TO 1
3060 FOR X6=0 TO 1
3080 FOR X5=0 TO 1
3090 FOR X4=0 TO 1
3100 FOR X3=0 TO 1
3110 FOR X2=0 TO 1
3120 FOR X1=0 TO 1
3130 FOR X0=0 TO 1
3135 Z%=1
3140 GOSUB 5000
3145 GOSUB 8000 'MAKE HEX FILE
3160 I=I+1
3165 NEXTX0:NEXTX1:NEXTX2:NEXTX3:NEXTX4:NEXTX5:NEXTX6:NEXTX7
3170 GOSUB 8500 'WRITE EOF AND CHECKSUM ON HEX FILE
3180 CLOSE
3200 END
5000 ' Build Phase Data
```

```
5020 PNT=0:LAST=0:AD=0
5030 PRINT #1,"":PRINT#1,"I CHAN ";X3;X2;X1;X0
5040            PRINT#1,"Q CHAN  ";X7;X6;X5;X4
5050 CNT=0
5060 L(0)=X0:L(1)=X1:L(2)=X2:L(3)=X3:L(4)=X4:L(5)=X5:L(6)=X6:L(7)=X7
5070 FOR K=0 TO 4
5080 ON K+1 GOSUB 5330,5340,5350,5360,5370
5090 ' HI=X7 XOR X6:IF HI=1 THEN GOSUB 7500
5100 IF K/2=INT(K/2) THEN EV=1 ELSE EV=0
5110 OD=SGN(K/2-INT(K/2))
5120 IADR=1*2^7+P0*2^6+P1*2^5+P2*2^4+P3*2^3+P4*2^2
5130 QADR=0*2^7+P0*2^6+P1*2^5+P2*2^4+P3*2^3+P4*2^2
5140 FOR J=0 TO 3
5150 Q1=TA(QADR+J)
5160 I1=TA(IADR+J)
5170 A=ATN(Q1/I1)
5180 IF I1<0 THEN A=A+PI
5190 IF Q1<0 AND I1>0 THEN A=A+2*PI
5200 IF J=0 AND K=0 THEN GOTO 5240
5202 A=A+AD
5205 IF ABS(ABS(LAST)-ABS(A))<=PI THEN GOTO 5240
5207 IF AD<>2*PI THEN GOTO 5210
5208 IF LAST>3*PI THEN AD=4*PI:GOTO 5235
5209 AD=0:GOTO 5235
5210 IF AD<>0 THEN GOTO 5220
5212 IF LAST>PI THEN AD=2*PI:GOTO 5235
5214 AD=-2*PI:GOTO 5235
5220 IF LAST>-PI THEN AD=0:GOTO 5235
5225 AD=-4*PI
5235 GOTO 5170
5240 PHASE(I,PNT)=A
5250 PRINT #1,INT(((A*180)/PI)+.5);:TC(Z%)=A:Z%=Z%+1
5260 IF CNT=9 THEN PRINT#1,"":CNT=0:GOTO 5280
5270 CNT=CNT+1
5280 PNT=PNT+1
5290 LAST=A
5300 NEXT J:NEXT K
5310 GOSUB 7000:' GO PHASE FILTER DATA
5320 RETURN
5330 P1=X3:P2=X7:P3=X2:P4=X6:P0=1:RETURN
5340 P1=X7:P2=X2:P3=X6:P4=X1:P0=0:RETURN
5350 P1=X2:P2=X6:P3=X1:P4=X5:P0=1:RETURN
5360 P1=X6:P2=X1:P3=X5:P4=X0:P0=0:RETURN
5370 P1=X1:P2=X5:P3=X0:P4=X4:P0=1:RETURN
5380 PT=P1:P1=P4:P4=PT:PT=P2:P2=P3:P3=PT:RETURN
7000 ' PHASE FILTER
7005 FOR Q%=0 TO 3
7010 OT(Q%)=0
7020 FOR W%=1 TO NFP
7030 OT(Q%)=OT(Q%)+TC(W%+Q%)*FLT((NFP-W%)+1)
7040 NEXT W%
7050 NEXT Q%
7060 FOR W%=0 TO 3
7070 PRINT #1,INT(((OT(W%)*180)/PI)+.5);
7080 NEXT W%
7085 PRINT #1," "
7087 PRINT #1," "
7090 RETURN
8000 L1%=I*1024+X3*512+X7*256+X2*128+X6*64+X1*32+X5*16+X0*8+X4*4
8010 L2%=L1%-1024
8020 FOR U%=1 TO 4
8030 SN(U%)=INT(OFS%+(SIN(OT(U%-1))*SF)+PF)
8040 CS(U%)=INT(OFS%+(COS(OT(U%-1))*SF)+PF)
8050 NEXT U%
8060 PRINT #4,":04";:' DATA LENGTH
8061 CS%=4+(L1% MOD 256)+INT(L1%/256)
8065 XL=LEN(HEX$(L1%)):XL=4-XL:TT$="":TT$=STRING$(XL,"0")
8070 PRINT #4,TT$;HEX$(L1%);: ' LEADING ZEROS AND ADDRESS
8080 PRINT #4,"00"; : ' RECORD TYPE
8085 PRINT #1,"SIN=";
8090 FOR U%=1 TO 4
8100 TT$=HEX$(SN(U%)):XL=LEN(TT$):TT$=STRING$(2-XL,"0")+TT$
8110 PRINT #4,TT$;
```

```
8115 CS%=CS%+SN(U%)
8116 PRINT #1,TT$;" ";
8120 NEXT U%
8130 CS%=CS% MOD 256: CS%=256-CS%:CS%=CS% MOD 256
8140 TT$=HEX$(CS%):TT$=STRING$(2-LEN(TT$),"0")+HEX$(CS%)
8150 PRINT #4,TT$
8200 PRINT #4,":04";
8205 CS%=4+(L2% MOD 256)+INT(L2%/256)
8210 XL=LEN(HEX$(L2%)):XL=4-XL:TT$="":TT$=STRING$(XL,"0")
8220 PRINT #4,TT$;HEX$(L2%);
8230 PRINT #4,"00";
8231 PRINT #1," COS=";
8240 FOR U%=1 TO 4
8250 TT$=HEX$(CS(U%)):XL=LEN(TT$):TT$=STRING$(2-XL,"0")+TT$
8255 CS%=CS%+CS(U%)
8260 PRINT #4,TT$;
8261 PRINT #1,TT$;" ";
8270 NEXT U%
8280 CS%=CS% MOD 256:CS%=256-CS%:CS%=CS% MOD 256
8290 TT$=HEX$(CS%):TT$=STRING$(2-LEN(TT$),"0")+HEX$(CS%)
8295 PRINT #4,TT$
8296 PRINT #1," "
8300 RETURN
8500 PRINT #4,":00000001FF"
8510 PRINT #4,
8520 CLOSE #4
8530 RETURN
10 REM Filename:  DFIL03.BAS
20 'revised 07/25/84
30 'started 10/07/83
40 GOTO 2000
100 HK(0) = 1
101 ON TY + 1 GOTO 9999, 119, 102, 112
102 HK(1) = 1: HK(2) = 1
103 HK(3) = .585943 'transition points
104 HK(4) = .100836
105 FOR I% = 5 TO ND%
106 HK(I%) = 0 'stop-band
107 NEXT I%
108 FOR I% = 0 TO ND%
109 PRINT #1, I% / NT, HK(I%)
110 NEXT I%
111 GOTO 170
112 FOR I%=0 TO ND%:HK(I%)=0:NEXT I%:' REM INIT ARRAY
113 FOR I%=0 TO TP%:PRINT:INPUT"ENTER POINT ";HK(I%):NEXT I%
114 FOR I%=0 TO TP%+1:PRINT #1,I%/NT,HK(I%):NEXT I%
115 GOTO 170
119 PRINT #1, I%, HK(0)
120 FOR I% = 1 TO TP%
130 HK(I%) = (1 + COS(PI * I% / NT)) / 2
140 PRINT #1, I% / NT, HK(I%)
150 NEXT I%
160 PRINT #1, I% / NT, 0
170 FOR I% = 0 TO ND%
180 H(I%) = HK(0)
190 FOR K% = 1 TO TP%
200 H(I%) = H(I%) + 2 * (HK(K%) * COS(2 * PI * K% * I% / NF%))
210 NEXT K%
220 H(I%) = H(I%) / NF%
230 NEXT I%
240 PRINT: PRINT"Enter number of D/A converter bits: ";
250 INPUT NB
260 JF = INT(2 ^ (NB - 1) + .5) 'jack factor
270 SF = .9 * JF / H(0) 'scale factor
280 PRINT #1," ":PRINT #1,"Resultant impulse response normalized to symbol period:
290 PRINT #1," ","7-digit",NB;"-bit"
300 PRINT #1,"time","response","response"
310 FOR I% = 0 TO ND%
320 HT(I%) = INT(SF * H(I%) + .5)
330 PRINT #1, I% / SS%, H(I%), HT(I%)
340 NEXT I%
350 PRINT #1," "
351 OPEN "O",#3,"FILTR.DAT"
```

```
352 FOR I%=0 TO ND%:PRINT #3,H(I%):NEXT I%
353 CLOSE #3
360 INPUT"Enter the ratio of prototype frequency steps to check frequency steps: '
370 PRINT #1,"Resultant Filter Frequency Response, checked at del-f /";R;
380 PRINT #1,"intervals:"
390 PRINT #1,"frequency","mirror","7 - digit",NB;"- bit"
400 PRINT #1,"(norm'd to","frequency","attenuation","attenuation"
410 PRINT #1,"symbol rate)"," "," (in db)","  (in db)"
420 FOR I% = 0 TO R * (ND% + .5)
430 WT = I% * 2 * PI / (NF% * R)
440 HH = H(0)
450 HR = HT(0)
460 FOR K% = 1 TO ND%
470 TC = 2 * COS(K% * WT)
480 HH = HH + H(K%) * TC
490 HR = HR + HT(K%) * TC
500 NEXT K%
510 IF I% = 0 THEN H0 = HR
520 HH = 10 * M * LOG(HH * HH)
530 HR = HR / H0
535 IF HR = 0 THEN HR = 1E-10
540 HR = 10 * M * LOG(HR * HR)
550 PRINT #1, I% / (R * NT), (R * NF% - I%) / (R * NT), HH, HR
560 NEXT I%
570 RETURN
2000 PI = 3.14159: M = .434295 'log10 of e
2010 I% = 0: K% = 0 'to reserve an early spot for these
2020 NF% = 0: SS% = 0: ND% = 0: NT = 0 'ditto
2030 HR = 0: H0 = 0: HH = 0: TP% = 0: TY = 0 'ditto
2040 DIM HK(40) 'HK are the desired freq. resp. samples
2050 DIM H(40) 'the H are the impulse response time samples
2060 DIM HT(40) 'the HT are truncated resolution versions of the H
2070 M1$="INTERSYMBOL INTERFERENCE AND JITTER FREE SYMBOL GENERATOR FOR QUADRAPHAS
2080 M2$="MODULATION HAVING CONSTANT ENVELOPE AMPLITUDE AND CONSTRAINED SPECTRUM"
2090 F$ = "DFIL01.BAS"
2100 WIDTH 78
2110 PRINT: PRINT: PRINT M1$: PRINT M2$: PRINT
2120 INPUT "Enter the number of samples per symbol: "; SS%
2130 PRINT: INPUT"Enter the number of points for the filter size: ";NF%
2132 PRINT: PRINT"Enter the desired filter type.  0 is out (unfiltered),"
2134 PRINT "  1 is ISIJF, and 2 is an adjustable min-max. "
2135 INPUT "  3 is user entered values. (Choose 0,1,2,3) ";TY
2140 PRINT: PRINT"Do you want results on the line printer? (Y/N)";
2150 AN$ = INPUT$(1)
2160 PRINT
2170 IF ((AN$ = "Y") OR (AN$ = "y")) THEN OPEN "O", 1, ":TO:" : GOSUB 2330: GOTO 2
2180 IF ((AN$ = "N") OR (AN$ = "n")) THEN OPEN "O", 1, ":CO:" ELSE GOTO 2140
2190 PRINT #1," "
2200 PRINT #1,"Samples of desired frequency response, normalized to symbol rate:"
2210 PRINT #1, "frequency","response"
2220 ND% = INT((NF% - 1) / 2)
2230 NT = NF% / SS% 'number of points in the transition zone, can be fractional
2240 TP% = INT(NT) 'transition points, integer
2250 GOSUB 100
2260 IF ((AN$ = "Y") OR (AN$ = "y")) THEN PRINT #1, CHR$(12) 'form feed to l.p.
2270 CLOSE #1
2280 PRINT: PRINT"Do you want to run this again? (Y/N)";
2290 AN$ = INPUT$(1)
2300 PRINT
2310 IF ((AN$ = "Y") OR (AN$ = "y")) THEN PRINT: GOTO 2010
2320 IF ((AN$ = "N") OR (AN$ = "n")) THEN END ELSE GOTO 2280
2330 PRINT #1," "
2340 PRINT #1, M1$: PRINT #1, M2$: PRINT #1, " "
2350 PRINT #1,"Samples per symbol: "; SS%
2360 PRINT #1,"Number of filter points: "; NF%
2370 PRINT #1," ": RETURN
2380 END
```

In summary, there has been provided a filtering method whereby the filter function is cross-correlated against a portion of a data stream. This results in a filtered waveform segment which is stored in an appropriate location in a memory. The address selecting this portion corresponds to the particular sequence of data bits. The data bits in the cross-correlated portion of the data stream are translated to an address to select the corresponding waveform segment for output therefrom. The waveform segment in digital form is then converted to an analog signal. Each of these analog signals is sequentially assembled into an analog waveform which comprises the filtered output. This filtered output is then applied to a modulation circuit to modulate a carrier.

Although the preferred embodiment has been described in detail, it should be understood that various changes, substitutions and alterations can be made therein without departing from the spirit and scope of the invention as defined by the appended claims.

What is claimed is:

1. A filter for filtering digital data, comprising:
   means for receiving a digital data stream containing the digital data;
   memory means for storing digital representations of analog waveform segments in predetermined addressable locations, said waveform segments corresponding to the cross-correlation of a predetermined filter function with a predetermined sequence and number of adjacent data bits, there being a plurality of different sequences of adjacent data bits with each predetermined sequence of adjacent data bits corresponding to a unique one of said waveform segments;
   address means for examining a frame of adjacent data bits in said data stream, said frame equal in length to said predetermined sequence and number of adjacent data bits, said address means generating an address for addressing one of said waveform segments corresponding to said predetermined number of adjacent data bits in said frame; and
   means for assembling said addressed waveform segments into an analog filtered waveform, each of said waveform segments having a duration equal to the duration of each of the data bits in said digital data stream, each increment by one data bit of said data stream providing a new frame for examining by said address means.

2. The filter of claim 1 wherein said predetermined filter function is cross-correlated with said data in the phase domain.

3. The filter of claim 2 wherein said predetermined filter function in the phase domain is converted to said analog filtered waveform in the amplitude domain.

4. The filter of claim 1 wherein said address means comprises a serial in, parallel out shift register for receiving said data stream on the serial input with the parallel output thereof comprising said address for addressing said memory means, said shift register shifting said data stream at the bit rate of said data stream with the number of outputs of said shift register being equal to said predetermined number of adjacent bits.

5. The filter of claim 1 wherein said digital representations of said analog waveforms comprise a series of data points for each of said waveforms and said assembly means comprises:

secondary address means for sequentially addressing the digital representations of each data point stored in said memory means corresponding to the one of said waveform segments addressed by said addressing means;
   converter means for converting the output of said memory means from a digital value to an analog value;
   sample and hold means for sampling and storing said analog value output of said converter means; and
   filter means for filtering said stored analog values.

6. The filter of claim 1 wherein said predetermined filter function is applied in the amplitude domain and said analog filtered waveform is output in the amplitude domain.

7. The filter of claim 1 wherein said analog filtered waveform comprises inphase and quadrature phase components with the sum of the square of said inphase and quadrature phase components being equal to unity as a result of cross-correlating said predetermined filter function with said data stream.

8. A phase modulation system for phase modulating a carrier with digital data, comprising:
   means for receiving a data stream of the digital data at a predetermined bit rate;
   memory means for storing digital representations of analog waveform segments at predetermined addressable locations, each of said waveform segments having a beginning point and an end point, each of said waveform segments corresponding to one current bit of data in said data stream with each of said waveform segments comprising the cross-correlation of a predetermined filter function with a predetermined number of data bits about said corresponding current data bit, each combination of said predetermined number of data bits of said one current data bit corresponding to at least one of said waveform segments;
   address means for examining said predetermined number of data bits about said one current data bit in said data stream and generating an address for addressing the one of said waveform segments corresponding to said one current data bit;
   means for assembling said addressed waveform segments into an analog filtered waveform such that one of said waveform segments has the end point thereof connected to the beginning point of the next adjacent one of said waveform segments, each of said waveform segments having a duration equal to said corresponding current data bit in said digital data stream; and
   means for phase modulating a carrier with said analog filtered waveform.

9. The phase modulation system of claim 8 wherein said predetermined filter function is cross-correlated with said digital data in the phase domain.

10. The phase modulation system of claim 9 wherein said analog filtered waveform is in the amplitude domain.

11. The phase modulation system of claim 9 wherein said filtered waveform is in the phase domain and said modulation means modulates said carrier with said phase domain filtered waveform.

12. The phase modulation system of claim 8 wherein said phase modulation system is a quadraphase shift key system and said analog filtered waveform comprises inphase and quadraphase components in the amplitude domain, said phase modulation means comprising a vector modulator.

13. The phase modulation system of claim 12 wherein each of said waveform segments is comprised of an inphase segment and a quadraturephase segment, and each of said inphase and quadraturephase segments is comprised of a plurality of analog data points with digital representations thereof stored at the associated addressable location wherein said means for assembling comprises:

secondary address means for sequentially addressing the digital representations of each of said data points for said inphase and said quadraturephase waveform segments stored in said memory means that correspond to said location addressed by said addressing means;

converter means for converting said digital values of said data points to analog values;

sample and hold means for sampling said converted analog values and storing said converted analog values for said inphase waveform segment on a first storage node and said converted analog values for said quadraturephase waveform segment on a second storage node; and first and second filter means for filtering said stored analog values in said first and second nodes, respectively, to provide said filtered waveform.

14. The phase modulation system of claim 8 wherein said predetermined filter function is cross-correlated with said predetermined number of data bits about said one current data bit in the amplitude domain and said analog filtered waveform is in the amplitude domain.

15. The phase modulation system of claim 8 wherein each of said analog waveform segments is comprised of a plurality of analog data points, the digitized values of said analog data points stored in the corresponding one of said addressable locations wherein said assembly means comprises:

secondary address means for sequentially addressing the digital representations of each data point stored in said memory means corresponding to the one of said waveform segments addressed by said addressing means;

converter means for converting the digital value of said point to an analog value;

sample and hold means for sampling and storing said converted analog value on a storage node; and filtering means for filtering said stored analog values to provide said filtered waveform.

16. The phase modulation system of claim 8 wherein said address means comprises a serial in parallel out shift register for receiving said received digital data stream from said receiving means on the serial input thereof and outputting said address on a parallel output, said shift register shifted at the digital data rate of said data stream such that for each shift of said shift register one of said frames is stored in said shift register and the sequence of bits in each of said frames comprises said address for addressing said memory means.

17. A filter for generating filtered inphase and quadraturephase components for phase modulation of a carrier, comprising:

means for receiving a stream of data bits at a predetermined data rate;

first storage means for storing digitized representations of waveform segments for the inphase components at a predetermined address location;

second storage means for storing digitized representations of waveform segments for the quadraturephase components at predetermined address locations therein;

said inphase and quadraturephase waveform segments generated by cross-correlating a predetermined filter function with a predetermined number of data bits about a current one of the data bits in said data stream, each of said waveform segments having a beginning point and an end point;

said predetermined addressable locations in said first and second storage means corresponding to the one of said data bits addressable by a common memory address;

address means for examining said one current bit and said predetermined number of bits about said one current bit to generate said memory address to output the corresponding one of said inphase and quadraturephase waveform segments;

means for converting said digitized inphase and quadraturephase waveform segments to an analog format; and means for assembling said converted inphase waveform segments in analog format to provide a filtered inphase waveform and said converted quadraturephase waveform segments in analog format to provide a filtered quadraturephase waveform such that for each assembled waveform, the corresponding ones of said waveform segments are assembled with the end point of one of said waveform segments connected to the beginning point of the next adjacent one of said waveform segments.

18. The filter of claim 17 wherein said means for converting comprises a first digital analog converter for interfacing with the output of said first storage means and a second digital to analog converter for intefacing with said output of said second storage means, said first and second digital to analog converters operable to convert said digital data to an analog value.

19. The filter of claim 18 wherein said inphase and quadraturephase waveform segments are comprised of a plurality of discrete values digitized and stored at the one of said predetermined locations corresponding to the associated waveform segment wherein said means for assembling comprises:

secondary address means for sequentially outputting the discrete values of said inphase component to said first digital to analog converter and the discrete values of said quadraturephase waveform segment to said second digital to analog converter when said memory address corresponding to the associated one of said predetermined locations is generated;

sample and hold means for sampling the output of said first digital to analog converter and storing the sampling analog value on a first storage node and sampling the output of said second digital to analog converter and storing the sampled value on a second hold node; and means for filtering said first and second hold nodes to provide the inphase and quadraturephase components.

20. The filter of claim 17 wherein said address means comprises a serial in parallel out shift register for receiving said digital data stream on the input thereof and outputting said one data bit and said predetermined number of data bits about said one data bit, the logic state thereof comprising said memory address.

21. A phase modulation system for phase modulating a carrier with digital data, comprising:

means for receiving a data stream of the digital data at a predetermined bit rate;

memory means for storing digital representations of phase segments at predetermined addressable locations, each of said phase segments corresponding to one current bit of data in said data stream with each of said phase segments comprising the cross-correlation of a predetermined filter function with a predetermined number of data bits about each of said corresponding current data bits, each combination of said predetermined number of data bits about said one current data bit corresponding to at least one of said phase segments, each of said phase segments having a beginning phase, an ending phase and a predetermined phase relationship between said beginning and ending phase;

address means for examining said predetermined number of data bits about said one current data bit in said data stream and generating an address for addressing the one of said phase segments corresponding to said one current data bit;

means for assembling said addressed phase segments into a sequential stream of digital data, the beginning phase in one of said phase segments sequentially following the ending phase in the adjacent one of said phase segments, each of such phase segments having a duration equal to said corresponding current data bits in said digital data stream; and means for phase modulating a carrier with the digital data output by said means for assembling.

* * * * *